Oct. 28, 1941.  P. J. SCHWARZHAUPT  2,260,842

ELECTRIC CAPACITOR

Filed Dec. 13, 1939

Inventor:
Paul J. Schwarzhaupt,
by Harry E. Dunham
His Attorney.

Patented Oct. 28, 1941

2,260,842

UNITED STATES PATENT OFFICE 2,260,842

ELECTRIC CAPACITOR

Paul J. Schwarzhaupt, Scotia, N. Y., assignor to General Electric Company, a corporation of New York Application December 13, 1939, Serial No. 309,018

9 Claims. (Cl. 175—41)

The present invention relates to electric condensers, or capacitors, and has for an objective the provision of improvements in construction and arrangement of elements in high voltage capacitors wherein a plurality of electrode carriers, in the form of rigid dielectric plates, disks, or the like and having metallic electrode coatings applied to opposite faces thereof, are assembled in parallel juxtaposition.

More specific objects of the invention are the provision of an improved form of electrode carrier and an improved contact assembly for effecting connection with the metallic electrode coatings, whereby more efficient current transfer and greater effectiveness of heat dissipation, with resultant increase in current carrying capacity, are secured in a capacitor such as referred to above.

Figure 1:
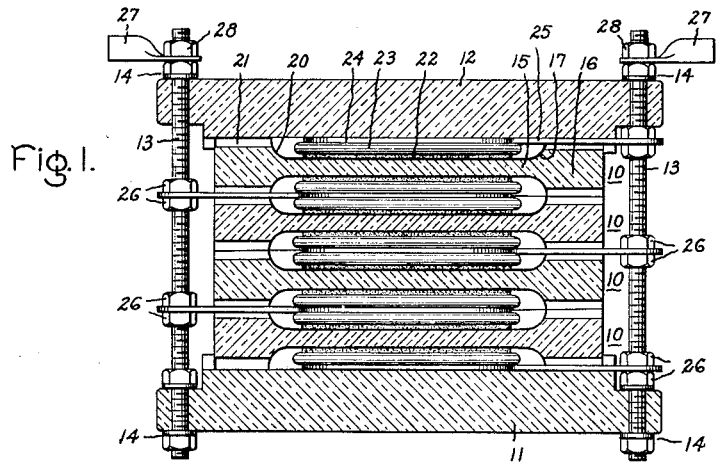
Figure 2:
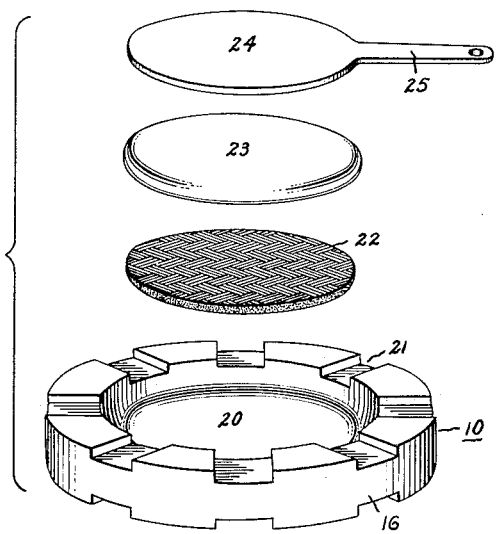
Figure 3:
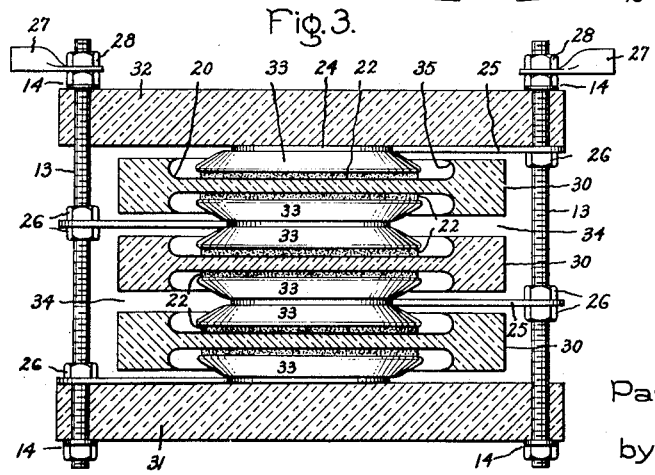

Other objects and the details of that which I consider to be novel and my present invention will become apparent from the following description and the claims appended thereto, taken in conjunction with the accompanying drawing wherein Fig. 1 illustrates, in sectional elevation, an exemplary form of capacitor embodying my invention; Fig. 2 is an exploded perspective view of certain elements of the structure of Fig. 1, and Fig. 3 illustrates, in sectional elevation, a second exemplary form of capacitor embodying my invention.

The capacitor of Fig. 1 comprises a plurality of disk-like electrode carriers 10 assembled coaxially in parallel juxtaposition and clamped between base and cover plates, 11 and 12 respectively, by means of threaded metallic tie rods 13 with cooperating clamping nuts and washers, indicated at 14. The electrode carriers preferably are constructed of titanium dioxide compound or other suitable high grade ceramic material, while the base and cover plates may be constructed of a lower grade ceramic or other suitable dielectric material having the required strength and rigidity. Each of the carrier disks is formed with a relatively thin web portion 15 and a substantially thicker rim portion 16 so as to define saucer-like depressions in the opposite faces of the disk. Both surfaces of the web portion are substantially flat and occupy the greater part of the opposite faces of the disk. The top and bottom surfaces of rim portion 16 are connected respectively with the top and bottom surfaces of web portion 15 by curved wall portions 17. Metallic coatings 20, preferably of silver, are plated or otherwise applied to the opposite surfaces of the web portion 15 and to the curved wall portions 17 to serve as electrodes. These coatings must be very thin or they will become detached from the dielectric due to thermal expansion.

Usually, capacitors of the form illustrated are designed for relatively high voltage operation, and, unless proper precautions are taken, corona may be produced which will cause overheating and breakage of the electrode carriers. Undesirable corona effects may be avoided by confining the electrostatic field to as great extent as possible within the solid dielectric, since the greatest stress occurs where field lines pass from a material of high dielectric to a material of lower dielectric strength, as from the carrier disks into the surrounding air. In the assembly of Fig. 1, the carrier disks are clamped so that the thick rim portions of adjacent disks are in abutting engagement, and the metal coated curved side wall portions 17 are so formed that adjacent metallic coatings of adjacent disks are in electrical contact around the edges, as will be seen from Fig. 1. Thus the metallic coatings on the curved side walls serve as shields to confine most of the electrostatic field lines within the solid dielectric of the thick rim portions of the disks. It has been found that by reason of the expedient just described, a capacitor constructed as shown in Fig. 1 is capable of operation at heavy current overloads and high voltages without undesirable corona effects.

In order to provide for proper ventilation of the assembly of Fig. 1, wherein adjacent disks are in contact and the end disks are in contact with the clamping end plates, the rim portions of the disks are formed with radial slots 21, and slots of adjacent disks are arranged to register, thereby providing openings through which air may be circulated to cool the electrode coatings as well as the contact assemblies described hereinafter.

The electrode coatings 20, due to their thinness, are of high resistance per unit area and of correspondingly low current carrying capacity. This introduces certain difficulties in the making of connections with the coatings. In order to avoid these difficulties, I have provided, for each of the coatings, an improved contact assembly which insures even contact pressure at a multiplicity of points over a large area of the surface of the coating. This contact assembly includes a flexible pad 22 of braided copper or other metal of good conductivity, which is of sufficient area to cover substantially the entire electrode coating on one surface of the web portion of a carrier disk. By reason of the employment of a pad of metallic braid it is insured that the desired evenly distributed contact over a large area will be afforded even though there may be irregularities in the surface of the web portion, and also, undesirable air spaces between the contact pad and the electrode coating are avoided. Each of the pads 22 is backed by a plate 23 which is constructed of brass or other suitable metal having good electric conductivity as well as the proper strength and rigidity to reinforce the contact pad. Preferably the edges of plates 23 are rounded so as to prevent corona formation, and the plates have sufficient thickness to provide large thermal capacity. As will be seen from Fig. 1, the contact assemblies for adjacent electrode coatings of adjacent carriers are arranged in back to back relationship with a connection plate 24, of copper or other suitable metal, disposed therebetween. Similar connection plates are provided for the end contact assemblies. Where silver is employed for the electrode coatings and different metals for the elements of the contact assemblies, as above described, the braided contact pads, backing plates, and connection plates are silvered so as to prevent electrolytic corrosion.

Connection plates 24 have arms 25 which project outwardly respectively through openings formed by certain of the slots 21, and the outer ends of these arms are secured to one or the other of the tie rods 13 by means of clamping nuts 26. In the arrangement illustrated, all the electrode coatings of one potential are connected, by means of their respective contact assemblies and connection plates, to the right-hand tie rod 13, while all of the electrode coatings of the opposite potential are connected by means of their respective contact assemblies and connection plates to the left-hand tie rod 13, thus providing a parallel capacitive connection. However, if a series capacitive connection is desired, it is necessary to employ only the uppermost and lowermost connection plates 24 and to reverse the position of one of these plates from its position shown in Fig. 1, so that it is connected with the left-hand tie rod. The tie rods are provided with connection lugs 27, held in place by means of nuts 28, for connection of the capacitor in an electric circuit.

With the electrode carrier disks and contact assemblies clamped between the base and cover plates, as previously described, an even distribution of electric current and heat transfer between the electrode coatings and their respective contact pads is secured, so that no localized stresses are produced. The desired amount of contact pressure may be secured by adjustment of the clamping nuts 14.

The embodiment of Fig. 3 also includes a plurality of electrode carrier disks, designated 30, with cooperating contact assemblies, clamped between a base plate 31 and a cover plate 32 by means of tie rods 13 and clamping nuts 14. In this latter embodiment, however, the backing plates 33 of the contact assemblies are of relatively greater thickness and are in the form of truncated cones so that they have increased rigidity and thermal capacity. Plates 33 are arranged so that the smaller end surfaces thereof are in contact with the connection plates 24 while their larger end surfaces bear against the braided metal contact pads 22. Thus, a more constant and uniform contact and heat transfer pressure is insured throughout the whole of the extent of the contact pads. A further difference is that, when the assembly is clamped as shown in Fig. 3, the greater thickness of backing plates 33 maintains the electrode carriers 30 in spaced apart relationship so that the spaces 34 between the carriers provide for ventilation and for outward projection of the arms 25 of the contact plates 24. Thus it is unnecessary to provide the electrode carriers with ventilation slots as in the previous embodiment. The side wall portions 35 of the depressions in the opposite sides of each electrode carrier disk are undercut and curved in such manner that the metallic coatings 20 thereon provide the proper stress distribution.

Both of the forms of contact assemblies herein described provide very evenly distributed and efficient electric current and heat transfer, without localized thermal or electrical stresses, and insure adequate heat dissipation, so that capacitors embodying my invention may be operated at much higher currents than would be possible with contact assemblies heretofore employed. A further advantage of the invention is that proper contact pressure may be secured without subjecting the electrode carrier disks to undesirable mechanical stress.

The invention is not limited strictly to the details of construction illustrated, and it is contemplated that other modifications and applications will suggest themselves to those skilled in the art. It is intended therefore that such modifications and applications as do not depart from the true spirit of the present invention shall come within the scope of the appended claims.

What I claim as new and desire to secure by Letters Patent of the United States is:

1. In an electric capacitor, a plurality of disk-like electrode carriers, each comprised of dielectric material and formed with a central web portion and a relatively thicker rim portion so as to define depressions in each of two opposite faces of the carrier, thin metallic coatings on the surfaces of the web portions of the carriers to serve as electrodes, said carriers being disposed coaxially in close parallel juxtaposition so that adjacent carriers have electrode coatings in opposed relationship, and means for connecting said coatings capacitively in an electric circuit, the rim portions of the carriers having substantially radial slots which are arranged so as to provide a plurality of passages extending from the periphery of the carriers into communication with each of the spaces formed by the depressions in opposed faces of adjacent ones of the carriers, the plurality of passages communicating with each of said spaces being located in angularly spaced relationship around the space, said passages being adapted to provide for circulation of air between the carriers.

2. In an electric capacitor, a plurality of disk-like electrode carriers, each comprised of dielectric material and formed with a central web portion and a relatively thicker rim portion so as to define depressions in each of two opposite faces of the carrier, thin metallic coatings on the surfaces of the web portions of the carriers to serve as electrodes, said carriers being disposed coaxially in close parallel juxtaposition so that adjacent carriers have electrode coatings in opposed relationship, and means for connecting said coatings capacitively in an electric circuit, the rim portions of the carriers having substantially radial slots which are arranged so as to provide a plurality of passages extending from the periphery of the carriers into communication with each of the spaces formed by the depressions in opposed faces of adjacent ones of the carriers, the plurality of passages communicating with each of said spaces being located in angularly spaced relationship around the space, said passages being adapted to provide for circulation of air between the carriers, the connecting means for opposed electrode coatings of adjacent carriers including a connection element extending outwardly from the space between the adjacent carriers through certain of the passages communicating with said space.

3. An electric capacitor comprising a plurality of electrode carriers, each comprising a rigid dielectric body having a central web portion and a relatively thicker rim portion defining depressions respectively in each of two opposite faces of the carrier, thin metallic electrode coatings of extensive area on the surfaces of said web portions, the carriers being arranged in parallel juxtaposition so that adjacent carriers have electrode coatings in opposed relationship, means for capacitively connecting said coatings in an electric circuit with adjacent coatings of adjacent carriers electrically interconnected, said connecting means including contact elements respectively for said coatings, each of which contact elements is relatively flexible and designed to have extensive area of engagement with its corresponding electrode coating, relatively rigid backing means for said contact elements, and means clamping said carriers, contact elements, and backing means so as to maintain the contact elements in substantially evenly distributed pressure contact with their respective electrode coatings.

4. In an electric capacitor including a relatively rigid electrode carrier comprised of dielectric material and having a thin metallic electrode coating of extensive area on a surface thereof, connection means for said coating including a contact element engaging and conforming closely to the surface contour of said coating throughout at least a major part of the surface area of the coating, means for maintaining substantially evenly distributed pressure contact between said element and said coating throughout the contact area, and a connection plate between said contact element and said last mentioned means.

5. In an electric capacitor including a relatively rigid electrode carrier comprised of dielectric material and having a thin metallic coating on a surface thereof to serve as an electrode, connection means for said electrode coating including a contact pad of metallic braid, clamping means for maintaining said pad in firm pressure engagement with said coating throughout an area of substantial extent, and a connection plate between said pad and said clamping means.

6. In an electric capacitor including a relatively rigid electrode carrier comprised of dielectric material and having a thin metallic coating on a surface thereof to serve as an electrode, a contact pad comprised of metallic braid and having a surface area of substantial extent, a relatively rigid backing member for said pad comprised of conductive material and having substantial mass and good heat absorbing properties, and means including said member for maintaining said pad in substantially evenly distributed pressure contact with said electrode coating over a relatively large area.

7. In an electric capacitor, connection means for an electrode of the capacitor including a contact element comprised of metallic braid and having a surface area of substantial extent, and clamping means for maintaining said element in firm pressure contact with a surface of said electrode throughout a substantial area, which said last means includes a relatively rigid conductive member backing up said contact element.

8. In an electric capacitor, connection means for an electrode of the capacitor including a contact element comprised of metallic braid and having a surface area of substantial extent, a relatively rigid disk-like backing member for said contact element, which said member is comprised of conductive material and has substantial mass, and means including said member operative to maintain said contact element in firm pressure engagement with a surface of said electrode.

9. In an electric capacitor, connection means for an electrode of the capacitor including a contact element comprised of metallic braid and having a surface area of substantial extent, a conductive backing member for said contact element, which said member is of generally frustro-conical form and is disposed for pressure of its larger end against said contact element, and means cooperative with said member to maintain the contact element in firm pressure engagement with a surface of said electrode.

PAUL J. SCHWARZHAUPT.